(12) United States Patent
Lin et al.

(10) Patent No.: US 8,271,136 B2
(45) Date of Patent: *Sep. 18, 2012

(54) TOUCH SENSITIVE ROBOT WITH TOUCH SENSOR BELT

(75) Inventors: Chen-Ter Lin, Taipei Hsien (TW);
Yung-Hung Chu, Taipei Hsien (TW);
Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 497 days.

This patent is subject to a terminal disclaimer.

(21) Appl. No.: 12/549,385

(22) Filed: Aug. 28, 2009

(65) Prior Publication Data

US 2010/0168916 A1    Jul. 1, 2010

(30) Foreign Application Priority Data

Dec. 31, 2008 (CN) .......................... 2008 1 0306733

(51) Int. Cl.
*G05B 15/00* (2006.01)
(52) U.S. Cl. .................... 700/258; 700/245; 700/264
(58) Field of Classification Search ........... 701/245–264
See application file for complete search history.

(56) References Cited

U.S. PATENT DOCUMENTS

| | | | |
|---|---|---|---|
| 6,389,329 B1* | 5/2002 | Colens ........................... 700/262 |
| 6,459,955 B1* | 10/2002 | Bartsch et al. ................. 700/245 |
| 6,483,054 B2* | 11/2002 | Suzuki et al. .............. 200/61.44 |
| 6,748,297 B2* | 6/2004 | Song et al. .................... 700/259 |
| 6,917,002 B2* | 7/2005 | Burgess et al. ............ 200/61.25 |
| 7,102,089 B2* | 9/2006 | Burgess et al. ............ 200/61.43 |
| 7,332,890 B2* | 2/2008 | Cohen et al. .................... 320/109 |
| 7,342,190 B2* | 3/2008 | Burgess et al. ............ 200/61.43 |
| 7,346,428 B1* | 3/2008 | Huffman et al. .............. 700/245 |
| 7,429,843 B2* | 9/2008 | Jones et al. .............. 318/568.12 |
| 7,474,941 B2* | 1/2009 | Kim et al. ..................... 700/258 |
| 7,577,499 B2* | 8/2009 | Sun et al. ...................... 700/255 |
| 2001/0017587 A1* | 8/2001 | Suzuki et al. .............. 340/545.7 |
| 2005/0010331 A1* | 1/2005 | Taylor et al. .................. 700/245 |
| 2007/0016328 A1* | 1/2007 | Ziegler et al. ................. 700/245 |
| 2008/0125907 A1* | 5/2008 | Lee et al. ....................... 700/245 |
| 2008/0155768 A1* | 7/2008 | Ziegler et al. ...................... 15/4 |
| 2008/0281470 A1* | 11/2008 | Gilbert et al. ................. 700/259 |
| 2008/0300720 A1* | 12/2008 | Kim et al. ..................... 700/245 |

* cited by examiner

*Primary Examiner* — Mary Cheung
*Assistant Examiner* — Truc M Do
(74) *Attorney, Agent, or Firm* — Altis Law Group, Inc.

(57) ABSTRACT

An exemplary touch sensitive robot includes a body, a touch sensor, a driver, and a controller. The body includes a control panel. The touch sensor includes a first conductive belt wrapped on the body, a second conductive belt provided around but spaced away from the first conductive belt, a power source applying a voltage to two distal ends of the first conductive voltage, and a voltage sensor interconnected between an end of the first conductive belt and an end of the second conductive belt. The second conductive belt is electrically deformable and contacts the first conductive belt when touched by a user so that a measured voltage of the voltage sensor change dependently of the location of the touch. The controller is for controlling the driver to spin the body based upon the measured voltage to orient the control panel to the user.

19 Claims, 5 Drawing Sheets

TOUCH SENSITIVE ROBOT WITH TOUCH SENSOR BELT

CROSS-REFERENCE TO RELATED APPLICATION

This application is related to a copending U.S. patent application Ser. No. 12/537,261 filed on Aug. 7, 2009 and entitled "TOUCH SENSITIVE ROBOT," and with the same assignees as the present application. The disclosure of the above-identified application is incorporated herein by reference.

BACKGROUND

1. Technical Field

The present disclosure relates to robots and, particularly to touch sensitive robots.

2. Description of Related Art

The touch sensitivity of most touch sensitive robots is realized by pressure sensors. However, a great number of pressure sensors are typically required to make the entire body of such a robot touch sensitive. As a result, the cost of the robot may be exorbitant.

Therefore, it is desirable to provide a touch sensitive robot which can overcome the above-mentioned problems.

BRIEF DESCRIPTION OF THE DRAWINGS

In the drawings, all the views are schematic.

DETAILED DESCRIPTION

Figure 1:
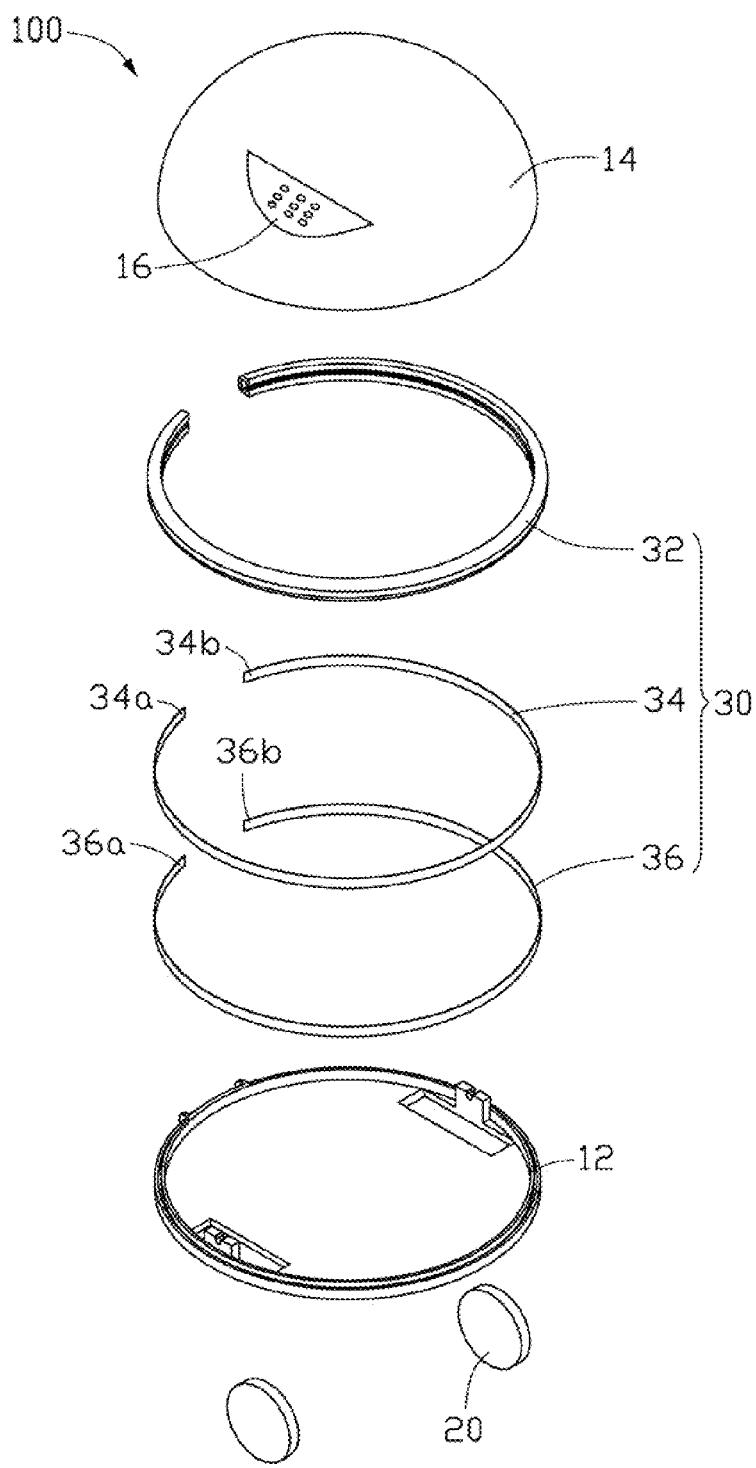
FIG. 1 is an isometric, exploded view of a touch sensitive robot, according to an exemplary embodiment of the present disclosure.
Figure 2:
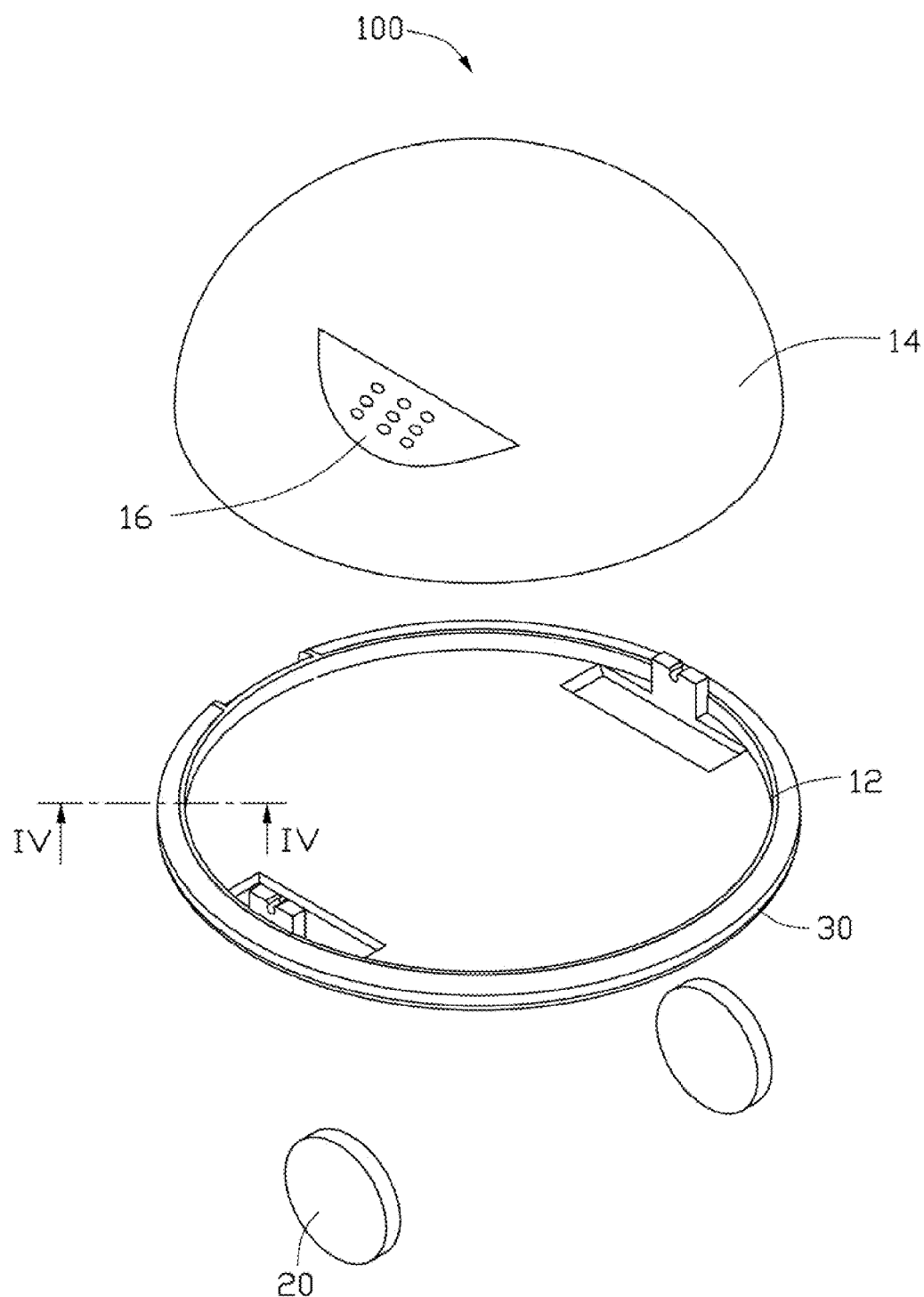
FIG. 2 is a partially assembled view of the touch sensitive robot of FIG. 1.
Figure 3:
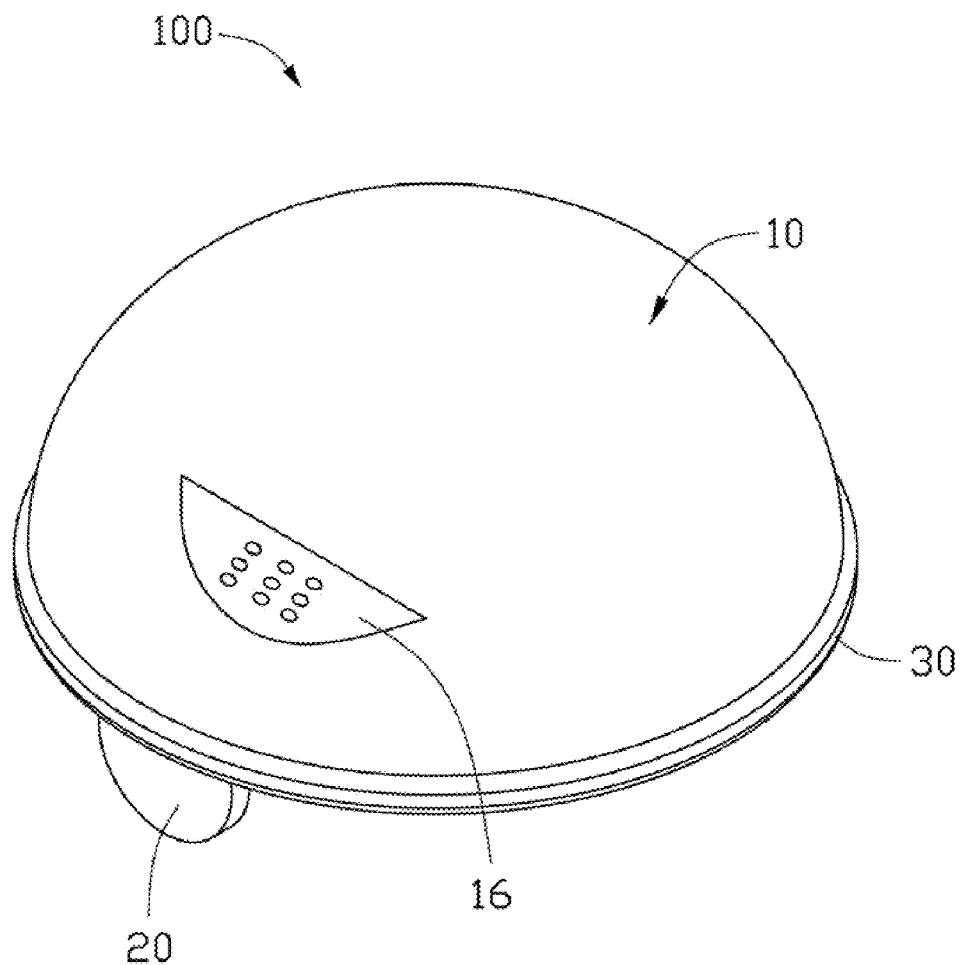
FIG. 3 is a fully assembled view of the touch sensitive robot of FIG. 1.

Referring to FIGS. 1-3, a touch sensitive robot 100, according to an exemplary embodiment, is disclosed. In this embodiment, the touch sensitive robot 100 is an automatic (robotic) vacuum cleaner. However, in other alternative embodiments, the touch sensitive robot 100 can be any of various other types of touch sensitive robots, e.g., a human-like robot or an animal-like robot. The touch sensitive robot 100 includes a body 10 and a touch sensor 30.

The body 10 includes a circular bottom board 12, a dome-shaped shell 14, an interactive section 16, and a pair of wheels 20. The dome-shaped shell 14 is sealed by the circular bottom board 12. As such, the circular bottom board 12 and the dome-shaped shell 14 cooperatively define an enclosed space for accommodating various components of the touch sensitive robot 100.

The interactive section 16 allows the touch sensitive robot 100 to interact with users. In this embodiment, the interactive section 16 is a control panel of the touch sensitive robot 100, and is mounted at the outer surface of the dome-shaped shell 14. However, in other alternative embodiments, the interactive section 16 can be in other forms, corresponding to the type of touch sensitive robot it belongs to. For example, the interactive section 16 can be a robotic head if the touch sensitive robot 100 is a human-like robot or an animal-like robot.

The pair of wheels 20 is movably connected to the circular bottom board 12 to facilitate motion of the body 10. In particular, the pair of wheels 20 can rotate to propel the circular bottom board 12 together with the dome-shaped shell 14 and the interactive section 16 to move along and around a surface. Also, the pair of wheels 20 can rotate independently of each other to drive the circular bottom board 12 together with the dome-shaped shell 14 and the interactive section 16 to spin around. In practice, the body 10 may further include one or more auxiliary wheels (not shown) to help the body 10 stand on its own and move around.

Figure 4:
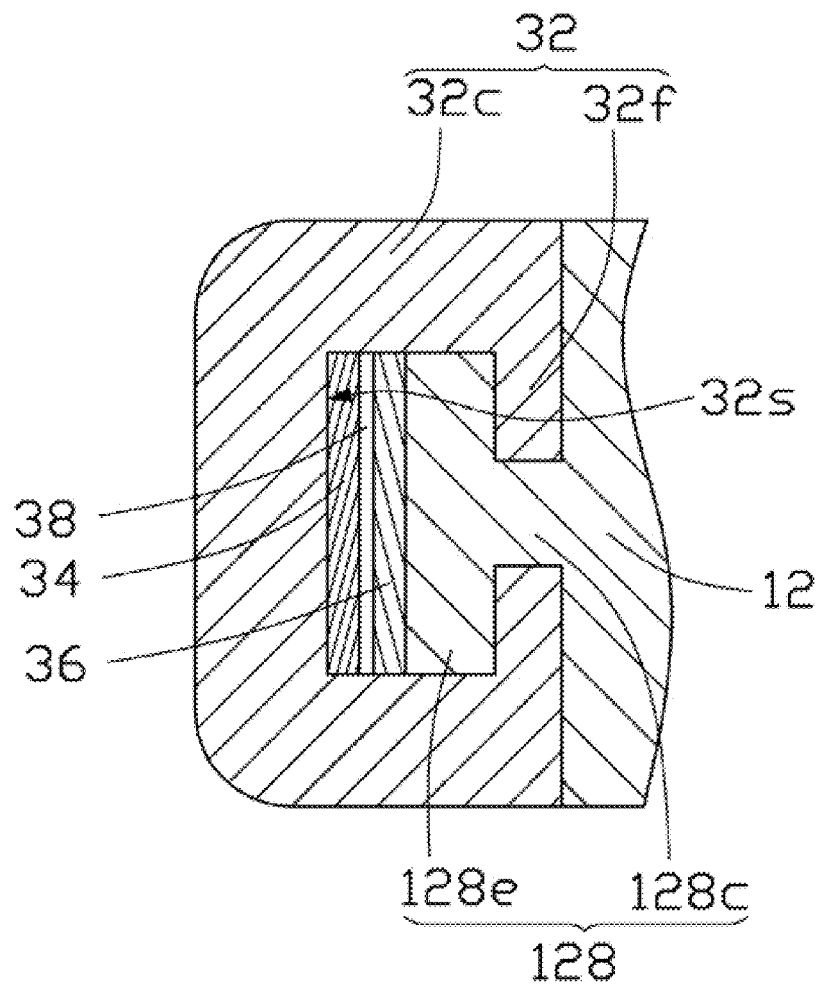
FIG. 4 is an enlarged, cross-sectional view taken along a line IV-IV of FIG. 2.

Also referring to FIG. 4, this is a cross-section taken along a left portion of a periphery of the circular bottom board 12. In the present embodiment, the circular bottom board 12 includes an attachment portion 128. The attachment portion 128 extends outwards from and partially encircles a periphery of a main body of the circular bottom board 12. As shown in FIG. 4, the attachment portion 128 includes a connecting plate 128c and an engaging plate 128e. The connecting plate 128c extends outwards away from the periphery of the main body of the circular bottom board 12. The engaging plate 128e extends from the connecting plate 128c, and is oriented substantially parallel to an extremity of the periphery of the main body of the circular bottom board 12. That is, the attachment portion 128 is in the form of a generally T-shaped plate extending from the periphery of the main body of the circular bottom board 12, albeit that the attachment portion 128 is generally arc-shaped when viewed from above.

The touch sensor 30 includes an isolating cover 32, a first conductive belt 34, and a second conductive belt 36.

As shown in FIG. 1, the isolating cover 32 is generally C-shaped; i.e., in the form of an incomplete circular loop. As shown in FIG. 4, in cross-section, the isolating cover 32 includes a cap-shaped covering section 32c and two engaging flanges 32f. The cap-shaped covering section 32c includes an inner peripheral surface 32s. Each flange 34f extends perpendicularly inwards from a corresponding top or bottom end of the cap-shaped covering section 32c. That is, the flanges 34f extend toward each other, and are parallel to and aligned with each other. The isolating cover 32 is made of an electrically isolating material such as rubber. In this embodiment, the isolating cover 32 is made of silica gel, which has excellent elasticity and deforms easily when touched.

The first conductive belt 34 includes a first end 34a and a second end 34b. The first conductive belt 34 is generally C-shaped, and is almost as long as the isolating cover 32. In this embodiment, the first conductive belt 34 is made of a conductive material having high elasticity, e.g., conductive rubber. As such, the first conductive belt 34 also elastically deforms easily when touched.

The second conductive belt 36 includes a third end 36a and a fourth end 36b. The second conductive belt 36 is generally C-shaped, and is as long as the isolating cover 32. Preferably, the electrical resistivity of the second conductive belt 36 is different from that of the first conductive belt 34. In this embodiment, the second conductive belt 36 is made of copper.

Referring to FIGS. 1 and 4, in assembly of the touch sensor 30, the second conductive belt 36 is looped around a major portion of and adhered to an outer surface of a periphery of the engaging plate 128e. Thus, a gap is formed between third end 36a and the fourth end 36b. The first conductive belt 34 is looped around and attached to a major portion of the inner peripheral surface 32s of the isolating cover 32. Then, the isolating cover 32 is deformably attached onto the attachment portion 128. In particular, the isolating cover 32 is attached to the attachment portion 128 via engagement of the engaging flanges 32f in upper and lower gaps between the engaging plate 128e and the main body of the circular bottom board 12. The distance between the inner peripheral surface 32s and the engaging flanges 32f is greater than the total thickness of the engaging plate 128e, the first conductive belt 34, and the second conductive belt 36. As such, upon assembly, the first conductive belt 34 attached to the inner peripheral surface 32s faces the second conductive belt 36 adhered to the engaging plate 128e, but is separated from the second conductive belt 36 by a gap 38.

Figure 5:
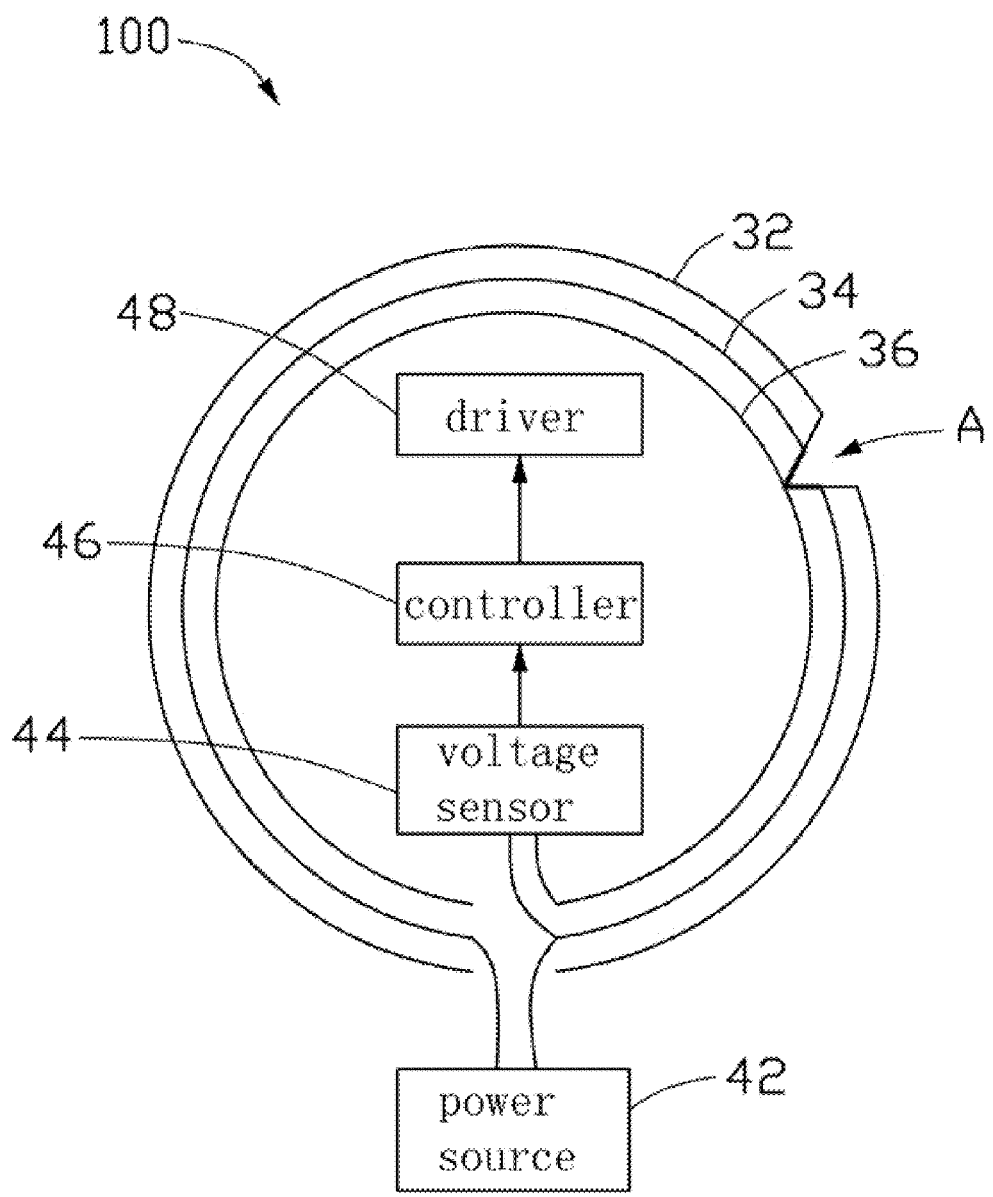
FIG. 5 is a plan view of a touch sensor of the touch sensitive robot of FIG. 1, also showing other parts of the touch sensitive robot in block diagram form.

Referring to FIG. 5, the touch sensor 30 further includes a power source 42 and a voltage sensor 44. The touch sensitive robot 100 further includes a controller 46 and a driver 48.

In further assembly of the touch sensitive robot 100, the power source 42 applies a voltage to the first end 34a and the second end 34b. The voltage sensor 44 is configured for measuring a voltage between the second end 34b and the fourth end 36b when the first conductive belt 34 is touched and electrically contacts the second conductive belt 36. Connections of the power source 42 and the voltage sensor 44 are not limited to the above-described embodiment. The voltage sensor 44 can instead be interconnected between any two points of the first conductive belt 34 and the second conductive belt 36, respectively. In other alternative embodiments, the power source 42 can be interconnected between the third end 36a and the fourth end 36b, and the voltage sensor 44 can be interconnected to any two points of the first conductive belt 34 and the second conductive belt 36. The controller 46 is connected to the voltage sensor 44, and is configured for controlling the driver 48 based upon a measured voltage received from the voltage sensor 44. The driver 48 is connected to the controller 46, and is configured for driving the pair of wheels 20 to rotate.

In operation of the touch sensitive robot 100, for example, a point A of the isolating cover 32 is touched by a user, as shown in FIG. 5. The isolating cover 32 and the first conductive belt 34 elastically deform and bend toward the second conductive belt 36. The first conductive belt 34 and the second conductive belt 36 contact each other at the point A. The voltage between the second end 34b and the fourth end 36b is proportional to a distance between the second end 34b and the point A. The voltage between the second end 34b and the fourth end 36b can be measured by the voltage sensor 44. In other words, the voltage sensor 44 can compute and identify (i.e. detect) the location of the point A on the first conductive belt 34. Thereby, the controller 46 can control the driver 48 to drive the pair of the wheels 20 based upon the voltage measurement obtained by the voltage sensor 44. Accordingly, the pair of wheels 20 can rotate independently of each other if and as needed, to spin the body 10 such that the interactive section 16 changes position to a position substantially corresponding to the location of the user who touched the point A.

It should be understood that, in other alternative embodiments, the voltage sensor 44 can be connected to another point (hereinafter "reference point") of the first conductive belt 34 besides the second end 34b. In such case, the voltage measured by the voltage sensor 44 is proportional to the length of the first conductive belt 34 from the reference point to the point A. With such configuration, the location of the point A can be detected by the voltage sensor 44.

In the touch sensitive robot 100, only one touch sensor 30 is employed. In addition, the touch sensor 30 is made of relatively inexpensive material and can be manufactured using relatively simple processes. Therefore, the cost of the touch sensor 30 is apt to be low. As such, the production cost of the touch sensitive robot 100 can be reduced.

It should be mentioned that the configuration of the body 10 is not limited to the present embodiment. The body 10 can be shaped and structured according to the type of touch sensitive robot employed.

It should also be noted that the touch sensor 30 is not limited to the present embodiment. For example, the isolating cover 32 can have other shapes, depending on practical requirements. In addition, the inner structure of the touch sensor 30 is not limited to the present embodiment. Any suitable structure having a pair of spaced conductive belts can be used. Beneficially, the outer conductive belt has excellent elasticity to readily deform when touched by a user. In addition, the isolating cover 32, the first conductive belt 34, and the second conductive belt 36 can all be made longer, so that they wrap around the entire outer surface of the body 10.

The connection between the touch sensor 30 and the body 10 is not limited to the present embodiment. In alternative embodiments, the touch sensor 30 can be attached to the body 10 using other techniques. For example, the isolating cover 32 can be attached to the circular bottom board 12 by adhesive.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass such modifications and similar arrangements.

What is claimed is:

1. A touch sensitive robot comprising:
a body;
a touch sensor comprising:
  a first conductive belt provided around at least part of the body;
  a second conductive belt provided around but spaced apart from the first conductive belt, the second conductive belt being elastically deformable and capable of contacting the first conductive belt when pressed by a user;
  a power source configured to apply a voltage to two distal ends of one of the first conductive belt and the second conductive belt; and
  a voltage sensor interconnected between the first conductive belt and the second conductive belt and capable of measuring a voltage when the second conductive belt contacts the first conductive belt;
a driver; and
a controller configured for controlling the driver to turn the body based upon the voltage measurement of the voltage sensor;
wherein the body further comprises a bottom board, an attachment portion extending outwards from and at least partially encircling a periphery of a main body of the bottom board, the touch sensor further comprises an isolating cover, the isolating cover covers the attachment portion and cooperates with the attachment portion to define a space between the isolating cover and the attachment portion, the first conductive belt and the second conductive belt are received in the space, the first conductive belt is attached to the attachment portion, and the second conductive belt is attached to the isolating cover and spaced from the first conductive belt;
the attachment portion comprises a connecting plate extending from the periphery of the main body of the bottom board, and an engaging plate extending from the connecting plate and being oriented substantially parallel to an extremity of the periphery of the main body of the bottom board, the isolating cover comprises a cap-shaped covering section and two engaging flanges, each engaging flange extends perpendicularly inwards from a corresponding top or bottom end of the cap-shaped covering section, with the engaging flanges engaging with the engaging plate.

2. The touch sensitive robot of claim 1, wherein the body further comprises a bottom board, a dome-shaped shell, and a pair of wheels, the bottom board sealing the dome-shaped shell, the interactive section being mounted at the outer surface of the dome-shaped shell, the pair of wheels being movably fixed to the bottom board and capable of spinning the body.

3. The touch sensitive robot of claim 1, wherein the isolating cover is made of rubber.

4. The touch sensitive robot of claim 1, wherein the isolating cover is made of silica gel.

5. The touch sensitive robot of claim 1, wherein the touch sensitive robot comprises a robotic vacuum cleaner and the interactive section comprises a control panel.

6. The touch sensitive robot of claim 1, wherein the first conductive belt forms a generally C-shaped loop and the second conductive belt forms a generally C-shaped loop.

7. The touch sensitive robot of claim 1, wherein the first conductive belt is made of a conductive material of a high elasticity.

8. The touch sensitive robot of claim 1, wherein the first conductive belt is made of conductive rubber.

9. The touch sensitive robot of claim 1, wherein the second conductive belt is made of copper.

10. The touch sensitive robot of claim 1, wherein the first conductive belt and the second conductive belt have different electrical resistivities.

11. A touch sensitive robot comprising:
a body comprising an interactive section configured for a user to interact with the touch sensitive robot;
a touch sensor comprising:
a pair of electrically conductive belts provided around at least part of the body, the belts parallel to but spaced apart from each other, an inner one of the belts adjacent to the body and an outer one of the belts separated from the body by the inner belt;
a power source applying a voltage to two distal ends of one of the belts; and
a voltage sensor electrically interconnecting the belts; the outer belt being capable of elastically deforming when touched by a user to contact the inner belt, and the voltage sensor configured to measure a change in the voltage caused by the contact and thereby identify a location of the touch;
a driver; and
a controller configured for controlling the driver to drive the body to move based upon the measured change in voltage so that the interactive section changes position to a location of the touch of the user,
wherein the body further comprises a bottom board, an attachment portion extending outwards from and at least partially encircling a periphery of a main body of the bottom board, the touch sensor further comprises an isolating cover, the isolating cover covers the attachment portion and cooperates with the attachment portion to define a space between the isolating cover and the attachment portion, the first conductive belt and the second conductive belt are received in the space, the first conductive belt is attached to the attachment portion, and the second conductive belt is attached to the isolating cover and spaced from the first conductive belt; and
wherein the attachment portion comprises a connecting plate extending from the periphery of the main body of the bottom board, and an engaging plate extending from the connecting plate and being oriented substantially parallel to an extremity of the periphery of the main body of the bottom board, the isolating cover comprises a cap-shaped covering section and two engaging flanges, each engaging flange extends perpendicularly inwards from a corresponding top or bottom end of the cap-shaped covering section, with the engaging flanges engaging with the engaging plate.

12. The touch sensitive robot of claim 11, further comprising an isolating cover for covering the pair of belts.

13. The touch sensitive robot of claim 12, wherein the isolating cover is made of rubber.

14. The touch sensitive robot of claim 12, wherein the isolating cover is made of silica gel.

15. The touch sensitive robot of claim 11, wherein each of the belts forms a generally C-shaped loop.

16. The touch sensitive robot of claim 11, wherein the outer belt is made of conductive rubber.

17. The touch sensitive robot of claim 11, wherein the inner conductive belt is made of copper.

18. The touch sensitive robot of claim 11, wherein the body further comprises a bottom board, a dome-shaped shell, and a pair of wheels, the bottom board seals the dome-shaped shell, the interactive section is mounted at the outer surface of the dome-shaped shell, the pair of wheels is movably fixed to the bottom board and capable of spinning the body.

19. The touch sensitive robot of claim 11, wherein the interactive section is a robotic head.

* * * * *